United States Patent

[11] 3,614,434

| [72] | Inventors | Norman H. Horwitz<br>Birmingham;<br>Kenneth J. Cook, Oak Park, both of Mich. |
|---|---|---|
| [21] | Appl. No. | 745,451 |
| [22] | Filed | July 17, 1968 |
| [45] | Patented | Oct. 19, 1971 |
| [73] | Assignee | James E. Lofstrom<br>Birmingham, Mich.<br>a part interest |

[54] AUTOMATIC AGITATING AND SAMPLE DEVICE
9 Claims, 12 Drawing Figs.

[52] U.S. Cl. .................................................. 250/71.5,
23/230, 23/253, 250/43.5, 259/30, 356/39, 356/197
[51] Int. Cl. ........................................................ G01t 1/20
[50] Field of Search .......................................... 250/43.5 R,
83.3, 71.5; 23/253, 230; 259/30; 356/197, 39

[56] References Cited
UNITED STATES PATENTS

| 3,206,602 | 9/1965 | Eberle | 250/71.5 |
| 3,376,114 | 4/1968 | Eberle | 23/230 |
| 3,451,777 | 6/1969 | Giulio | 23/230 |

*Primary Examiner*—William F. Lindquist
*Assistant Examiner*—Davis L. Willis
*Attorney*—Burton and Parker ABSTRACT: The disclosed apparatus includes a turntable which rotatably agitates a plurality of randomly positioned vials, each containing a liquid sample. The turntable is then automatically indexed to receive a pipette in one of the vials after a predetermined agitation period, and the autopipettor withdraws an accurately measured liquid sample. The liquid sample may then be pumped to a further station for testing. The disclosed embodiment includes a scintillation detector, counter and printing calculator adapted to measure and record the radioactivity of the sample. The apparatus is controlled by a timing and sequencing control, operably connected to each of the elements of the apparatus.

3,614,434

INVENTORS
NORMAN H. HORWITZ
KENNETH J. COOK

BY Whittemore
Hulbert & Belknap
ATTORNEYS

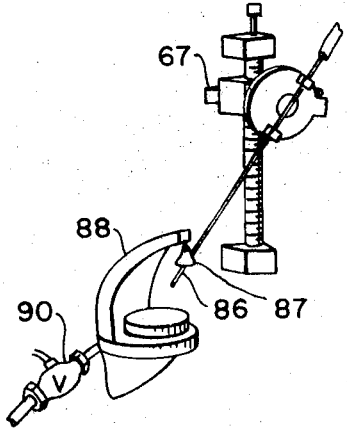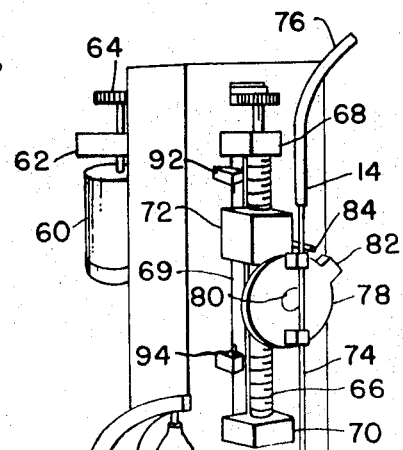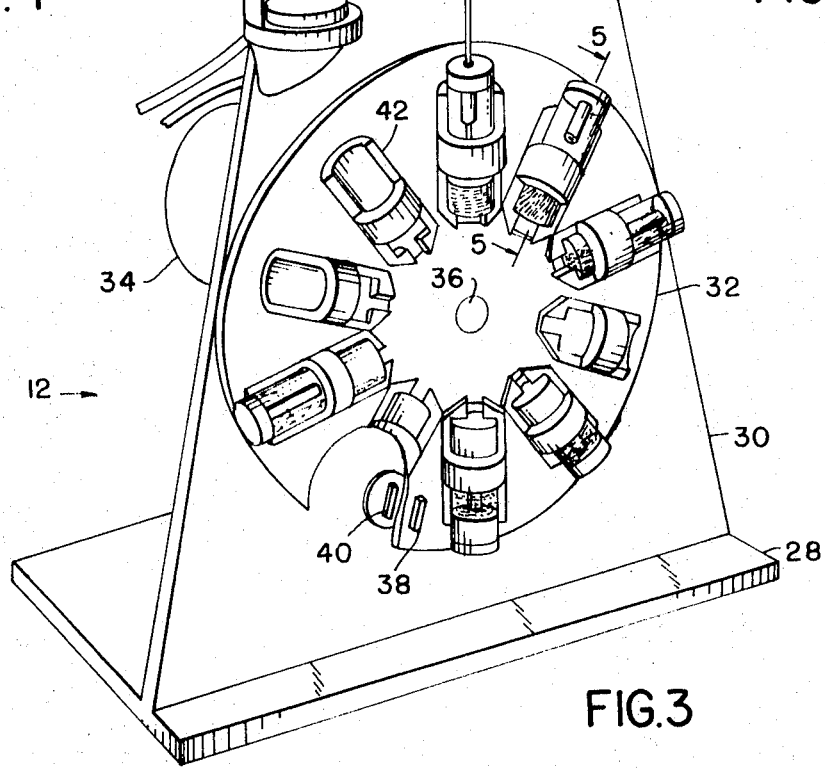

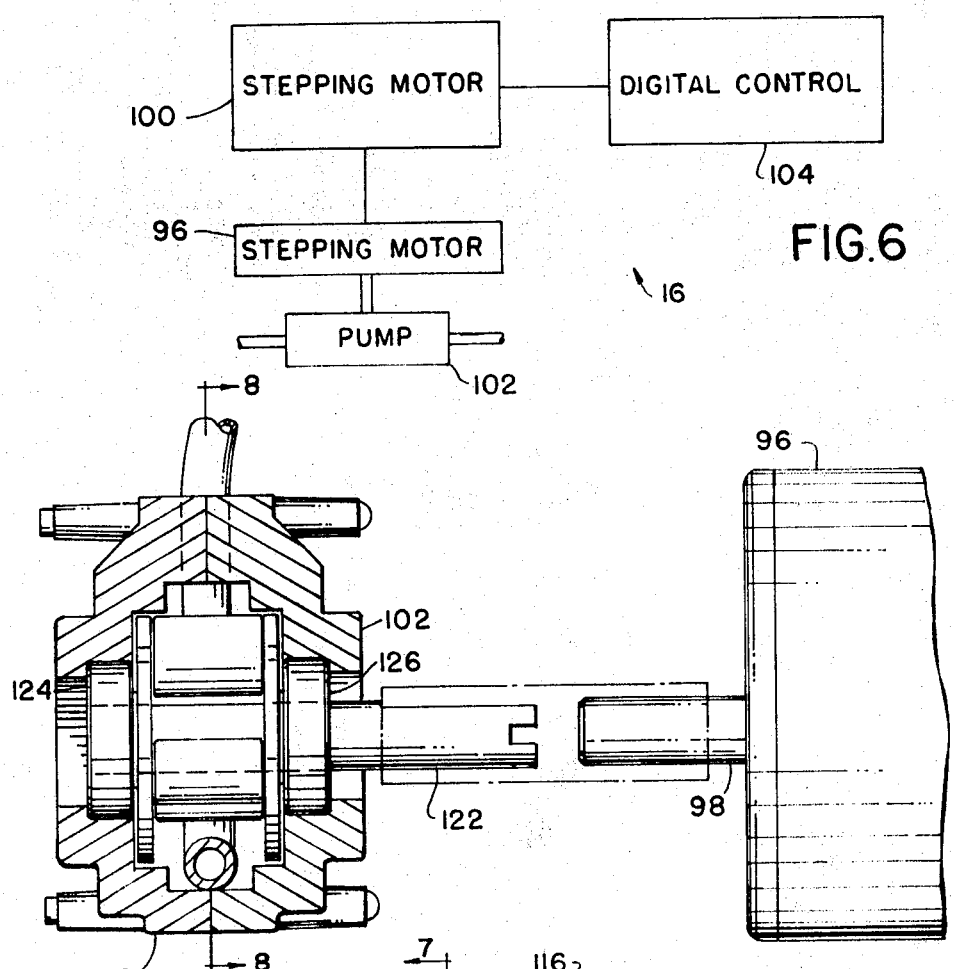
FIG. 6
FIG. 7
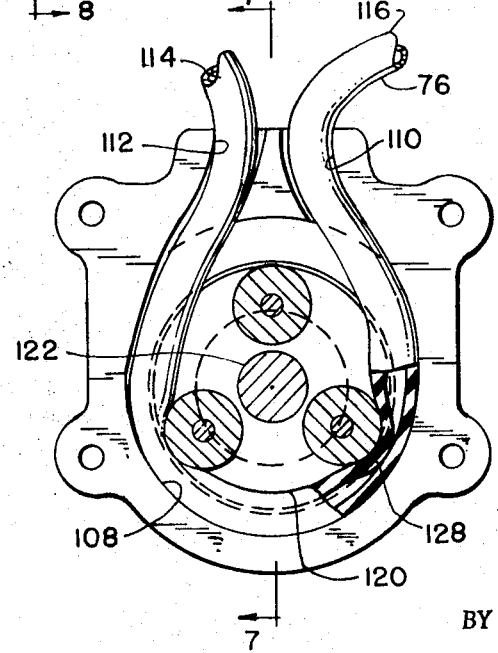
FIG. 8
INVENTORS
NORMAN H. HORWITZ
KENNETH J. COOK
BY *Whittemore
Hulbert & Belknap*
ATTORNEYS

AUTOMATIC AGITATING AND SAMPLE DEVICE

In the disclosed test procedure for example, a sample of buffered blood serum is placed in a vial on the turntable agitator of the apparatus and incubated at room temperature for approximately 1 hour, while radioactive beads are tumbled through the sample. At the end of the incubation period a portion of the now radioactive serum sample is pumped from the vial into the autopipettor and subsequently into the scintillation detector. The amount of radioactivity of the sample portion is detected and a count provided on the counter proportional thereto. At the end of the count the printing calculator is caused to print sample number information, scintillation count and the thyroid binding index directly.

The sample vial structure in which the liquid sample is positioned to the turntable may be turned through 360° without spilling the sample therein, while still allowing removal of the sample by direct insertion of the pipette of the autopipettor into the vial through an opening in the cap thereof due to the provision of an inner elongated hollow stem on the vial cap. The autopipettor includes a pivotally mounted dip tube. An abutment means is positioned between a fixed support and the dip tube to cause pivoting of the dip tube in an upper limiting position into a wash position in which water may be drawn through the dip tube.

The disclosed embodiment of the pumping means is a metering pump includes a peristaltic pump driven by an accurate stepping motor through a stepping motor translator in accordance with a digital control signal to provide a very accurate, simple fluid metering device.

The timing and sequencing control includes circuits for remembering the position of the sample vials on the turntable agitator and when the agitator or incubation period is completed. There is also provision in the timing and sequencing control circuits for determining which of the positions on the turntable agitator are empty or have a sample vial therein which has been tested, as well as circuits to prevent insertion of a sample vial on the turntable agitator during a counting and read out cycle, and circuits for synchronizing the position of the turntable agitator with the dip tube of the autopipettor and timing the operation of the elements of the apparatus.

BACKGROUND OF THE INVENTION

1. Field Of The Invention

This invention relates generally to a liquid sampling and agitating device, wherein the samples are agitated for a predetermined period of time and thereafter automatically withdrawn. There is also disclosed herein an improved sample vial, metering pump and autopipettor apparatus.

2. Description Of The Prior Art

In the past assessment of a patient's thyroid function has been used in diagnostic procedures. Initially the thyroid function was determined by symptoms providing an indication of metabolic status. Tests for the basic metabolism of a patient were later developed to provide a more accurate determination of a patient's thyroid function. At a still later date a thyroid binding index test was developed for measurement of thyroid hormone blood levels, which test is faster and less expensive than the basic metabolism rate test previously used.

The test for the thyroid binding index includes agitating a buffered blood serum sample with ion exchange resin beads tagged with radioactive thyroxine for a predetermined incubation time, counting the radioactivity transferred to the blood serum in the incubation period and comparing the radioactivity transferred to a sample of patient's blood serum with the radioactivity transferred to a normal blood serum sample recorded with a scintillation detector to provide a computed thyroid binding index accordance with the formula:

$$\frac{\text{Net patient count}}{\text{Net control count}} \times \text{Normalizing factor} = \text{TBI}$$

The thyroid binding index test has the advantage of requiring only a few minutes of the patient's time and is relatively low in cost. This test also involves the use of very low radioactivity so that there is no danger to the patient and no special laboratory license is required, the apparatus of this invention is capable of automating substantially the entire thyroid binding index test for example, after the blood serum has been buffered and placed in the sample vial.

SUMMARY OF THE INVENTION

The apparatus of this invention is adapted to automatically perform a number of fluid sample tests, such as the thyroid binding index test, which have previously required manual testing procedures and techniques. For simplicity of description and explanation however the apparatus and elements of this invention will be described hereinbelow in the context of a thyroid binding test, although it will be understood that the apparatus for example is capable of performing numerous other tests and the invention is not so limited.

The liquid sampling and agitating device of this invention includes a turntable agitator adapted to receive a plurality of sample vials, each containing a liquid sample. The turntable is rotatable to agitate the fluid samples and is thereafter automatically indexed to the timing and sequencing control to receive a pipette in one of the sample vials, when the agitation of the liquid sample therein is complete. The autopipettor then automatically withdraws a liquid sample and pumps the sample to another station for testing. The timing and sequencing control is also capable of remembering the random position of each sample vial on the turntable and when the agitation of the liquid sample is complete; the turntable is thereafter indexed as described.

In the disclosed apparatus the turntable agitator receives a plurality of vials containing buffered blood serum for an incubation period during which the sample of blood serum is agitated or tumbled with radioactive ion exchange resin beads by rotation of the sample vials without spilling any of the blood serum due to the construction of the sample vials. An autopipettor is also provided for automatically removing a portion of the radioactive, buffered blood serum from a vial after a predetermined incubation period along with a metering pump for metering the portion of blood serum withdrawn from the particular vial and for pumping the sample of blood serum to a scintillation detector, for subsequently pumping water through the autopipettor, pump and scintillation detector and finally for pumping air through the autopipettor, pump and scintillation detector to dry them and prepare them for a new blood sample portion form another vial. Disclosed apparatus of the invention further includes a counter responsive to the scintillation detector to actuate a printing calculator which in turn is programmed to print out the sample number, the count from the scintillation detector and a computed thyroid binding index. Sequential operation of the turntable agitator, autopipettor, mechanical pump, scintillation detector, counter and printing calculator is controlled by a unique timing and sequencing circuit.

The vials, the turntable agitator and autopipettor are interrelated in operation and are believed to contain novel features, as for example, the elongated hollow stem on the vial cap allowing complete rotation of the vial on the agitator turntable in a vertical position with a predetermined amount of buffered serum therein without any of the serum spilling from the vial, while permitting entry of the autopipettor into the vial through the hollow stem of the cap with the vial in a predetermined position, and the stationary abutment pin and pivotal mounting of the autopipettor dip tube, whereby the autopipettor is placed in an angularly rotated wash position when the dip tube is in an upper limiting position.

The particular metering pump provided is believed to be unique in that a pump, such as the peristaltic pump shown in the disclosure when driven by a stepping motor through a translator under accurate control by a digital controller will provide particularly simple, accurate metering of fluids. The pump need not necessarily be a peristaltic pump and the stepping motor may be reversible in accordance with the invention to provide flow in either direction through the pump.

The timing and sequencing control in accordance with the invention sequences the operation of the other elements of the apparatus for the determination of thyroid binding index and more particularly in accordance with the invention provides a memory function to determine where the blood serum samples are positioned on the turntable agitator, when the incubation period has been completed and what the state of operation of the apparatus for the determination of thyroid binding index is. Thus, for example, the timing and sequencing control will remember when a counting and read out cycle is in progress or if an empty position as available on the turntable agitator. The timing and sequencing control further provides means for resynchronizing the turntable agitator immediately before a counting and readout cycle is started and for preventing entry to the turntable agitator when a counting and read out cycle is in progress.

BRIEF DESCRIPTION OF THE DRAWINGS

FIG. 3 is a perspective view of the turntable agitator and autopipettor structure illustrated in block form in FIG. 1.

FIG. 4 is a partial perspective view of the autopipettor portion of the structure illustrated in FIG. 3 showing the dip tube in an upper-limit wash position.

FIG. 5 is an enlarged longitudinal section view of a portion of the turntable agitator illustrated in FIG. 3, taken substantially on the line 5—5 in FIG. 3, and particularly showing the vial structure on the invention.

FIG. 6 is an expanded block diagram of the metering pump of a portion of the invention.

FIG. 7 is a partial elevation view of the stepping motor and pump illustrated in block form in FIG. 6 and showing the pump in section along line 7—7 in FIG. 8.

After 8 is a transverse section view of the pump structure in FIG. 7 taken on the line 8—8 in FIG. 7.

Figure 2:
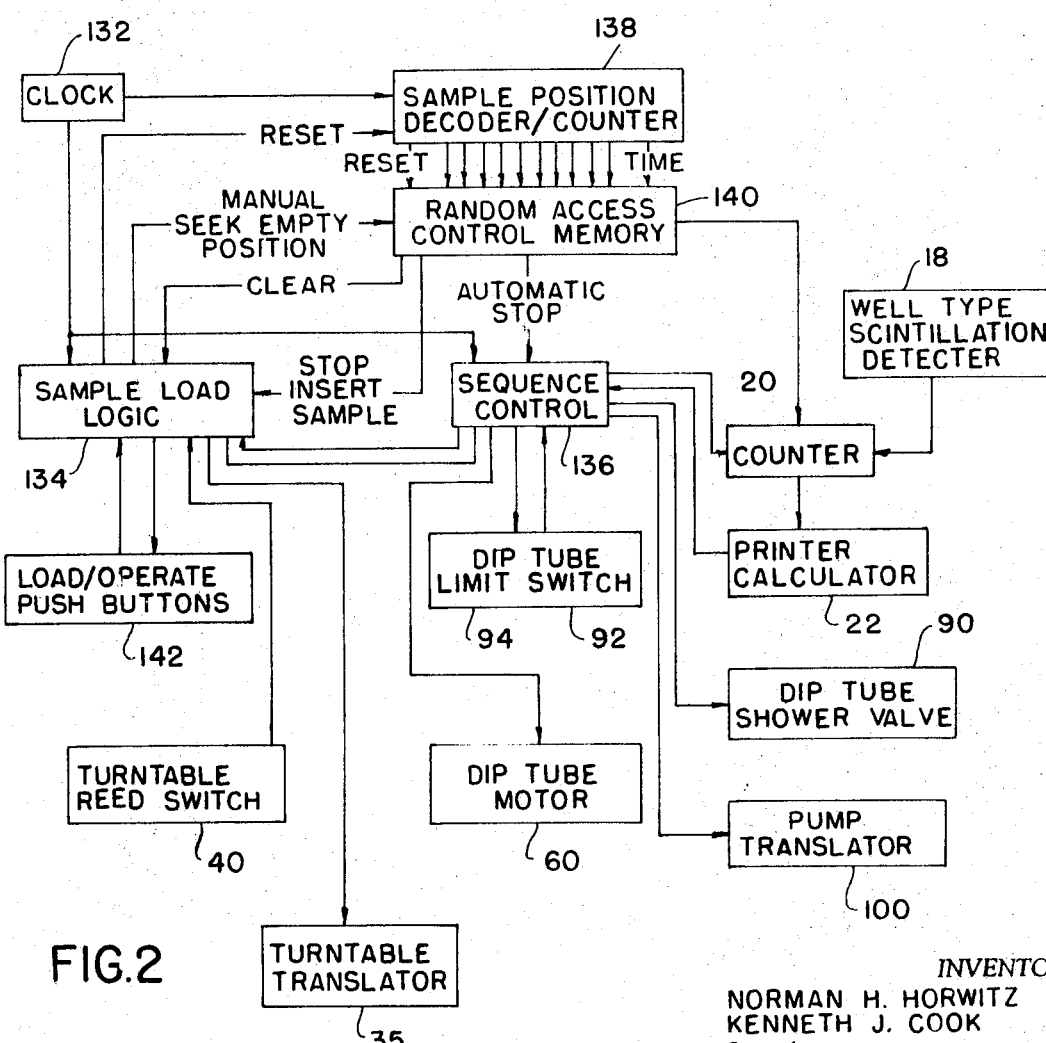
FIG. 2 is an expanded block diagram of the electrical portion of the apparatus for the determination of thyroid binding index, shown in FIG. 1.

FIGS. 9, 10, 11 and 12, together, form a partly schematic and partly block diagram of the electronic portion of the invention and is an expansion of the block diagram illustrated in FIG. 2.

DESCRIPTION OF THE PREFERRED EMBODIMENT

Figure 1:
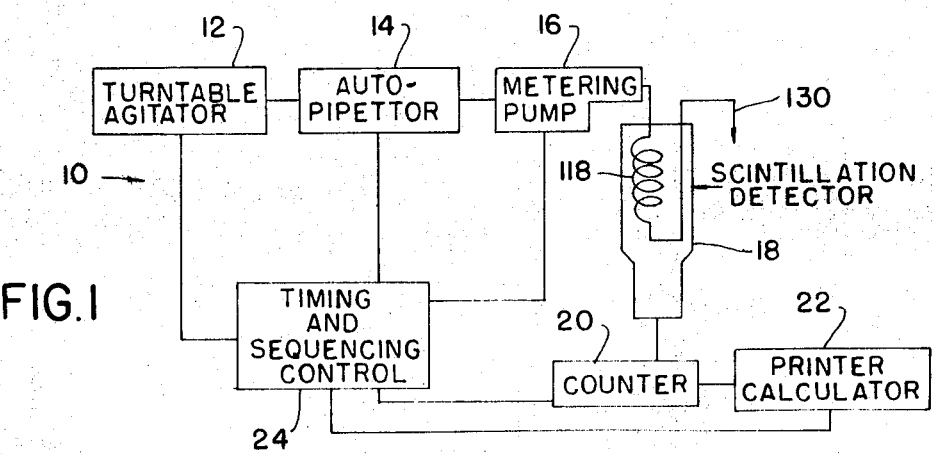
FIG. 1 is a partially block, partially schematic diagram of apparatus for the determination of the thyroid binding index of blood serum constructed in accordance with the invention.

As shown in FIG. 1, the apparatus for the determination of thyroid index 10 includes a turntable agitator 12, an autopipettor 14, a metering pump 16, a scintillation detector 81, a counter 20 and a printing calculator 22, connected in series. The timing and sequencing control 24 is connected to each of the turntable agitator, autopipettor, metering pump, counter and printing calculator and functions to time and sequence control the operation thereof.

In operation a sample of buffered blood serum 48 as shown in FIG. 5, which may be prepared by use of an autodilutor (now shown) is placed in a vial 26 on the turntable agitator 12, shown in FIG. 3, for tumbling or agitation for a predetermined incubation period with radioactive ion exchange beads 50. After the incubation period a portion of the now radioactive blood serum sample is withdrawn from the vial 26 of the turntable agitator 12 through the autopipettor 14 by operation of the metering pump 16, see FIG. 1 and 2. The sample is subsequently pumped in to the scintillation detector 18 and the radioactivity of the blood serum sample detected to provide a count on the counter 20. At the end of a predetermined time the sample number, the count in the counter 20 and a computed thyroid binding index of the blood sample is printed by the printing calculator, all under the control of the timing and sequencing control 24.

More specifically, the turntable agitator 12 and the particular vial 26 used in conjunction therewith, along with the autopipettor 14 are illustrated in detail in FIGS. 3 through 5. The turntable agitator includes the base 28 having the vertically extending portion 30. A wheel 32 is secured to output shaft 36 of an electric stepping motor 34 for rotation in a vertical plane on the motor being energized. Motor 34 is rigidly secured to the vertically extending portion 30 of the base 28.

A magnet 38 is positioned in the wheel 32 and operates in conjunction with the reed-switch 40 secured to the portion 30 of the base 28 to provide the timing and sequencing control 24 schematically illustrated in FIGS. 1 and 2 with a synchronizing signal to synchronize the position of the wheel 32 and therefore the vials 26 positioned thereon with the timing and sequencing control and therefore the dip autopipettor of the auotpipettor 14. Plastic sample vial retainers 42 are provided on the wheel 32 at 10 equally angularly spaced, radial positions, into which the vials 26 are positioned for movement with wheel 32 as will be considered subsequently.

The vials 26, as shown best in FIG. 5, include a cylindrical portion 44 having a closed lower end 46 for receiving a sample of buffered blood serum 48 therein to be tumbled with the radioactive beads 50 contained in the vials 26. The vials 26 further include the cap 52 having the O-ring seal 54 therearound and an elongated hollow stem 56. The opening 58 through the elongated stem 56 extends completely through the cap 52, whereby the dip tube 74 of the autopipettor 14 is permitted to enter the sample tube 26 to withdraw a portion of the sample of buffered blood serum 48 therefrom.

Due to the provision of the elongated stem 56 on the cap 52, the vials 26 may be rotated through 360° on the vertical wheel 32 in one of the retainers 42, as shown in FIG. 3, without any of the blood serum 48 escaping from as shown in FIG. 3 the vial 26, providing the level of the blood serum 48 is maintained, such that in any rotative position of the wheel 32, the blood level in the vial 26 does not cover any portion of the inner end of the opening 58 through the cap. Exemplary fluid levels due to rotation of the vial 26 are shown in dotted lines in FIG. 5.

It will be noted that the inner end of the opening 58 is not below any of the fluid levels indicated. Such condition is essential to prevent spilling of the blood serum from the vials 26 on tipping of the vials 26 upside down. The wheel 32 must of course be rotated at a speed, such that the buffered blood serum is allowed to flow freely in the vial 26 rather than being violently agitated therein.

The autopipettor 14 includes a motor 60 rigidly secured to support 62 which in turn is secured to the vertical portion 30 of the base 28 of turntable agitator 12. When the motor 60 is energized, the chain drive 64 is driven therefrom is caused to rotate the elongated screw 66 supported for rotation in the bearings 68 and 70 on the vertically extending portion 30 of the base 28. Rotation of the screw 66 will cause movement of the nut 72 thereon which is prevented from rotation with the screw 66 by a tongue 67 shown in FIG. 4 and slot 69 operable between the nut and the vertically extending portion 39 of the base 28 as shown in FIG. 3. Movement of the nut 72 vertically on the screw 66 will produce vertical movement of the dip tube 74 having the flexible tube 76 secured thereto since the dip tube 74 is carried by the member 78 which is pivoted by pivot structure 80 to the nut 72.

The dip tube 74 is thus caused to move vertically into a sample vial 26 positioned exactly beneath the dip tube 74 on actuation of the motor 60 in one direction. As shown in FIG. 3, the dip tube 74 is in a partly down position. On rotation of the motor 60 in the opposite direction, the dip tube 74 is moved vertically upwardly out of a vial 26 positioned therebeneath and as it is moved upwardly, the projection 82 on the member 78 engages the abutment pin 84 to cause rotation of the member 78 and therefore the dip tube 74 secured thereto into a wash position, as shown in FIG. 4. In the position shown in FIG. 4 the end 86 of the dip tube 84 is placed beneath water shower structure 88 which may be provided with a washing hood 87 thereon to which water may be passed through water valve 90 in response to a signal from the timing and sequencing control 24 as will be considered subsequently.

Limit switches 92 and 94 are also provided in conjunction with the autopipettor 14 to provide a signal for the timing and sequencing control when the dip tube 74 is in either the lower limiting or upper limiting position.

The metering pump 16, shown best in FIGS. 6 through 8, includes the stepping motor 96 which may be any of a number of commercially available stepping motors which provide exact incremental movement of the drive shaft 98 for each individual electrical impulse provided the motor 96. In the present disclosure a stepping motor which will make one complete revolution of the drive shaft 98 for each 200 energizing pulses therefore is used.

The energizing pulses for the stepping motor 96 are provided through a stepping motor control or translator 100 which translator changes digital voltage pulses into current driving pulses for the stepping motor 96. Such stepping motor controls are also well known in the electronic art and will not be considered in detail herein. Both the stepping motor 96 and the stepping motor control 100, along with the peristaltic pump 102 are included in the metering pump 16 in the block diagram of FIG. 1.

The digital control which provides voltage pulses to the stepping motor control for energizing the stepping motor may provide voltage pulses from a control clock, a gate or a counter and the pulses may cause stepping of the motor 96 in opposite directions. Again digital controls for stepping motors are available in accordance with the desired operation of the stepping motor. The digital control in the present disclosure is from the timing and sequencing control 24 and is indicated in FIG. 6 by the numeral 104 since the digital control for the motor 96 is only a part of the timing and sequencing control.

The pump 102 is, as shown best in FIGS. 7 and 8, a peristaltic pump and includes an outer case 106 having a circular chamber 108 therein and the openings 110 and 112 extending radially therethrough through which the tube 76 is inserted to extend around the chamber 108, as shown best in FIG. 8. The end 114 of the tube 76 is connected to the top of the dip tube 74, as shown best in FIG. 3, while the end 116 of the tube 76 is connected to the coil 118 which may be inserted in the well of the well type scintillation detector 18 as shown in FIG. 1.

Discs 120 are rotatably mounted within the chamber 108 in the outer case 106 of the pump 102 for rotation on the pump shaft 122 in bearings 124 and 126 carried by the case 106. Shaft 122 is connected to motor shaft 98, as shown best in FIG. 7. Three rollers 128 are secured for rotation to the discs 120 in equally spaced angularly separated positions, as shown best in FIG. 8, and are dimensioned to pinch the tube 76 closed at the rollers as the shaft 122 is rotated.

Thus, in operation, when it is desired to meter a portion of a sample of blood serum from a vial 26 with the dip tube 74 in the blood serum, as shown in FIG. 3, or when it is desired to pump a sample of blood serum from the autopipettor 14 to the scintillation detector 18, see FIG. 1, the digital control provides a discrete number of pulses to the stepping motor control which number of pulses is determined by the timing and sequencing control 24.

The stepping motor control produces exact rotation of the stepping motor output shaft 98 in accordance with the number of digital pulses received from the digital control 104. Thus, the pump drive shaft 122 is rotated a predetermined amount so that the rollers 128 force a predetermined exactly metered quantity of air or metered fluid through the tube 76 causing withdrawal of a predetermined portion of serum from a vial 26 or transfer of a predetermined sample of serum from the autopipettor 14 to the coil 118 in the scintillation detector 18 through the pump 16.

When it is desired to wash out the autopipettor, metering pump and scintillation detector, the dip tube 74 will be in the upper limiting position, as shown in FIG. 4, and water will be provided through the wash structure 88. The pump will then be operated for a predetermined time which need not be accurately controlled and the sample from the coil 118 and any contaminants in the autopipettor and metering pump will be pumped through the coil 118 to drain through the conduit 130, see FIG. 1. Similarly, air will be passed through the autopipettor, metering pump and scintillation detector for a predetermined time during a cycle of operation of the apparatus 10 for determination of thyroid binding index to dry them.

It will be understood that the stepping motor 96 may be of any type providing a discrete angular position of the output shaft 98 in accordance with digital control signals. Further, it will be understood that the stepping motor 96 may be reversible and that the pump 102 need not be a peristaltic pump and the pump, as shown, may be of any type whereby fluid may be pumped therethrough in opposite directions.

The electronic portion of the apparatus for determination of thyroid binding index 10, shown in FIG. 2, more particularly includes a clock 132, for providing clock pulses at 60 and 30 hertz which can be reduced to 15 hertz where desired. As shown, the clock pulses are provided to the sample load logic circuit 134, the sequence control circuit 136 and the sample position decoder counter 138.

The sample position decoder counter 138 provides an output pulse on the ten output conductors between the sample position decoder counter and the random access memory circuit 140 in accordance with the position of a vial 26 beneath the dip tube 74, see also FIG. 3. The sample position decoder counter circuit is synchronized the reed switch 40 and the magnet 38 on the wheel 32 of the turntable agitator.

The random access control memory circuit 140 functions to remember the position of the vials 26 of the wheel 32 in conjunction with the sample position decoder 138 and to determine when the time of agitation of the vials 26 has expired. It is thus connected to provide an automatic stop signal to the sequence control 136 or a manual stop insert sample signal to the sample logic circuit 134 in response to a remembered time of positioning a vial 26 of the wheel 32 or a manual seek empty position signal applied thereto through the sample load logic circuit 134 from the load operate pushbuttons 142.

Sequence control circuit 136 is effective on receiving an autostop signal from the random access control memory circuit 140 to gate the clock 132, and stop the turntable translator 34 and to start a sequence of events resulting in the transferring a portion of a sample in a vial to the scintillation 18 after which a counting and print out sequence in the counter 20 and printer calculator 22 is initiated. The sequence control 136 at this time serves to initially actuate the dip tube motor 60, the pump translator 100, and the dip tube shower valve 90. After the entire counting and printout cycle has been completed by the printing calculator 22 the sequence control receives a signal from the printer calculator 22, whereby it gates the clock on and restarts the turntable translator again.

Thus, an overall sequence of operation of the apparatus for the determination of thyroid binding index 10 includes the steps of pressing a load operate pushbutton 142, whereby the sample position decoder counter 138 determines the availability of an empty position of the wheel 32 of the turntable agitator 12 in conjunction with the random access control memory 140 and the sample load logic circuit 134 is caused to stop the turntable translator at the next available position at the top of the wheel 32, see also FIG. 3.

A vial 26 having a buffered sample of blood serum and radioactive beads therein is positioned in the vial retainer 42 of the wheel 32 and the operate pushbutton is pushed to start the turntable translator 34 again through the sample load logic circuit 134.

Sometime in the future determined by the random access control memory and sample position decoder counter circuits 140 and 138 at which the contents of vial 26 on the wheel 32 have been sufficiently incubated, an automatic stop signal is sent to the sequence control circuit 136 from the random access control memory circuit 140. At this time the sequence control circuit 136 initiates a signal which again gates a portion of the output of the clock 132 off and stops the turntable translator 34 with the vial 26 again exactly positioned beneath the dip tube 74 in conjunction with a one revolution synchronization of the wheel 32 by reed switch 40 in conjunction with magnet 38 after an autostop signal is generated in the random access memory circuit 140.

The dip tube motor 60 is then actuated to drive the dip tube 74 down into the vial 26 through the opening 58 in the cap thereof. When the dip tube 74 arrives at its lower limit position the limit switch 94 on the autopipettor is actuated and the pump 16 is energized through pump translator 200 for a precise number of counts, whereby a precise sample of radioactive buffered blood serum is withdrawn from the vial 26 into the autopipettor 14. After the precise number of counts, the dip tube motor is started in a reverse direction so that the dip tube is withdrawn from the vial 26. As the dip tube 74 moves upward, the pin 82 and abutment 84 operate to move the dip tube 74 into the position shown in FIG. 4 beneath the shower structure 88.

When the dip tube is in the upper limit position, the limit switch 92 is actuated to deenergize the dip tube motor and again start the pump 16 for a precise number of counts whereby the blood serum sample portion in the autopipettor 14 is transferred through the metering pump 16 into the coil 118 in the well of the scintillation detector 18.

The counter 20 is caused to count and the printing calculator is subsequently signalled to provide a printout of the position of the vial from which the sample portion in the scintillation detector 18 was taken and the count recorded by the counter and to compute the thyroid binding index and provide a readout thereof in accordance with the above indicated formula.

The sequence control circuit 136 then starts the pump translator again, and turns the shower valve 90 on whereby the autopipettor 14, metering pump 16 and coil 118 in the scintillation detector 18 are washed out. The sequence control circuit 136 then causes the water valve 90 to be closed, whereby air is drawn through the autopipettor 14, metering pump 16 and coil in the scintillation detector 18 to dry them out. The apparatus 10 for the determination of thyroid binding index is then ready to either accept a new buffered blood serum sample or start a counting and printout cycle due to a sample of buffered blood serum previously placed on the turntable agitator 12 having been incubated and tumbled for the desired time.

It will be understood that, as shown in the diagram of FIG. 2, appropriate clear signals are provided the electronic circuit for the apparatus 10 for determination of the thyroid binding index on initial turning of the apparatus to establish proper operating conditions in the circuit components. Also, it will be understood that reset signals are provided as necessary, to reset the elements of the electronic portion of the apparatus 10 as needed to perform the indicated functions.

While much of the circuitry necessary for the operation of the electronic portion of the apparatus 10 is within the skill of the electronic art, the specific circuit for the apparatus for determination of thyroid binding index disclosed herein is shown in FIGS. 9 through 12.

Figure 9:
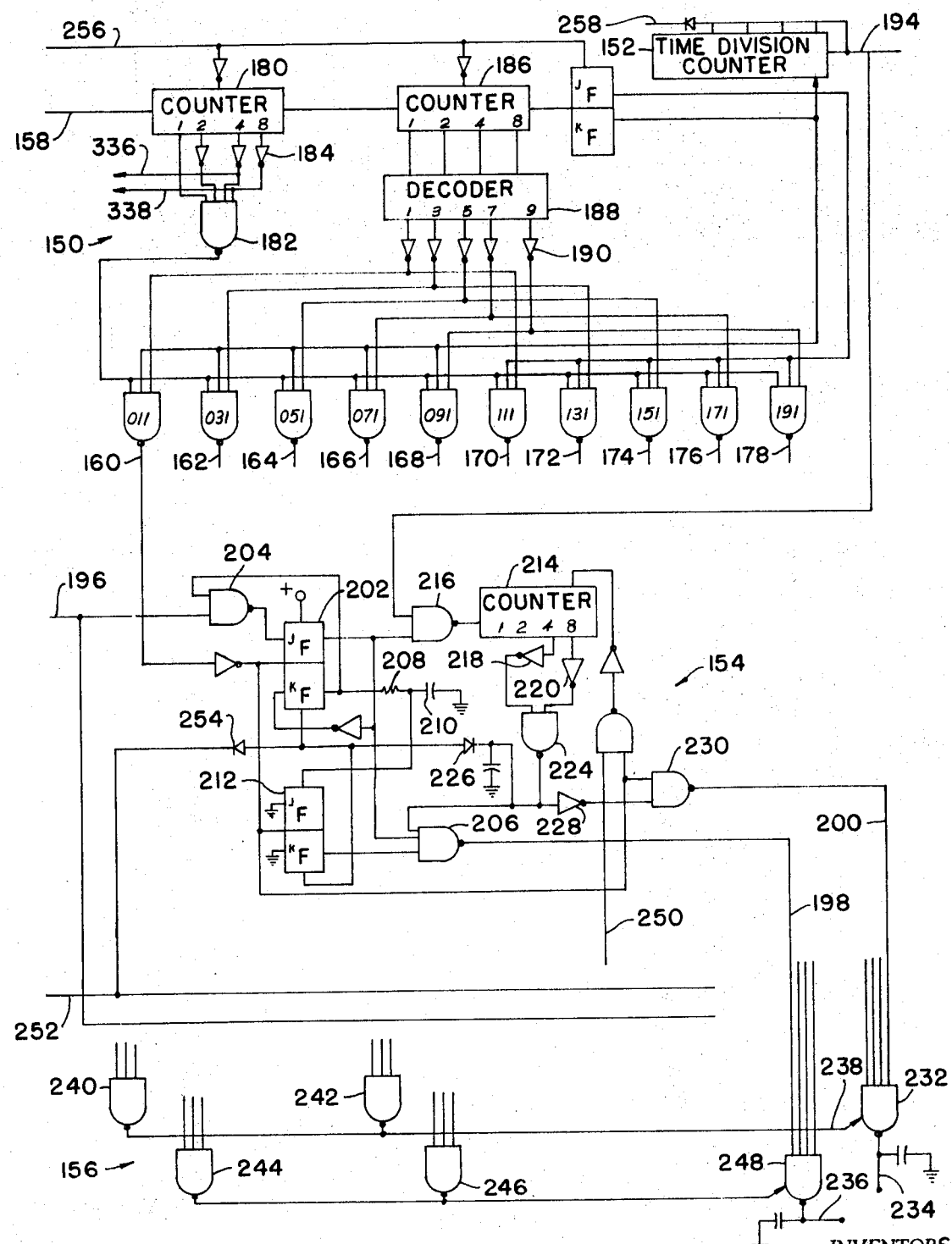

The circuits shown in FIG. 9 include in more detail the sample position decoder counter circuit 138 and the random access control memory circuit 140 expanded into a time sequence circuit 150, a time division counter 152, one sample board circuit 154 and a manual or automatic stop encoder circuit 156.

The time sequence circuit 150 receives a 60 hertz clock signal in on conductor 158 and provides an output signal indicating one of the sample vials 26 is in the vertical position beneath the dip tube 74 on one of the output lines 160, 162, 164, 166, 168, 170, 172, 174, 176, or 178, each of which is associated with a separate vial position on the wheel 32 of the turntable agitator 12, see also FIG. 3.

The 60 hertz signal on conductor 158 is used to trigger the counter 180 to provide an output signal through the gate 182 only when the counter counts one. Thus, every time the counter 180 counts one, a signal is provided in the units position on the gates associated with the output lines 160 through 178. Inverters 184 are provided in the 2, 4 and 8 count lines of the counter 180 so that the output from the gate 182 will be provided only on a one count of the counter 180.

The counter 186 receives an input pulse from the counter 180, such that one count is provided in the counter 186 for each ten counts in the counter 180. Thus, the counter 186 ultimately through the decoder 188 and inverters 190 provides an output in the ten's position of the gates connected thereto only on the odd counts of the output of the decoder 188. Decoder 188 is a binary-coded decimal to ten line decoder. Only the odd lines of the 10-line output of the decoder 188 are used to provide an output form the decoder 188, as shown.

A flip-flop 192 is connected to receive one trigger pulse for every 10 pulses of the counter 186 so that the flip-flop 192 on changing states will provide an output in the 100's position on the gates associated with the output lines 160 through 178, as shown.

Thus, in the operation of the circuit 150, 200 clock pulses are provided as an input on conductor 158 and an output is provided on conductors 160 through 178 on the 11 input clock pulse, the 31 clock pulse and on 51, 71, 91, 111, 131, 151, 171, and 191 input clock pulses. It will therefore be seen that if the input clock pulses are synchronized with the position of the wheel 32 of the turntable actuator, as they are by means of the reed-switch 40 and magnet 38, a pulse will be provided on the output lines 160 through 178 every time a vial 26 is in the exact vertical position beneath dip tube 74 which can be used to address the wheel 32 with the vials in such position.

The time division counter circuit 152 operates to provide an output pulse for every 96 input pulses and therefore provides an output pulse on conductor 194 every 5.3 minutes with a 60 hertz clock pulse into the counter 180.

The output signals from the conductors 160 through 178 of the time sequence circuit 150 and the time division counter 152 are fed to each of 10 separate sample board circuits only one of which is illustrated. The sample board circuit 154 associated with 11 clock pulses is connected to conductors 160 and 194 as shown and is operable on receiving a seek empty position signal on conductor 196 or on receiving a sufficient number of timing pulses on conductor 194 to provide either a manual stop signal on conductor 198 or an automatic stop signal on conductor 200.

The signal on conductor 196 establishes a condition on flip-flop 202 to toggle or change conditions when the vial in the zero position of the 11-count position is in a vertical location under dip tube 74 as determined by an output on the conductor 160 providing the zero position is either empty on the wheel 32 or contains a sample vial should be removed since the counting and readout cycle for the sample material in the vial has been completed.

When the flip-flop 202 changes state a condition is placed on the gate 206 to provide an output on the conductor 198. Subsequently when a time constant determined by the resistor 208 and capacitor 210 has expired the flip-flop 212 which is wired only to recognize a condition is caused to change state whereby the output from the gate 206 is removed.

On changing state of the flip-flop 202 a signal is also fed back to the gate 204 to prevent any further signals from being fed through the gate 204 until the flip-flop 202 is reset and a signal is fed to the flip-flop 202 which prevents toggling thereof by a pulse form conductor 160 until the flip-flop 202 is reset.

A sample vial then placed in position one on wheel 32 will rotate on the wheel 32 until 12 pulses have been received by the counter 214 from gate 216 which has been enabled by the changed state of the flip-flop 202. After 12 counts in the counter 214 a signal is provided through inverters 218 and 220 and gate 224. The signal through gate 224 holds a reset condition of the flip-flop 202 through steering diode 226 and at the same time through inverter 228 provides an output through gate 230 the next time a pulse is received on the sample board circuit 154 through the conductor 160 indicating that the vial position one is in position to have a sample removed therefrom.

The signal through gate 230 passes through conductor 200 through gate 232 to provide an automatic stop signal on conductor 234 in the manual automatic stop circuit 156 just as the manual stop signal provides an output on conductor 236 in the circuit 156 through gate 248.

In the circuit 156 the gate 232 is provided with an expander connection 238 thereto whereby signals from the gates 240 or 242 will cause an output signal from the conductor 234. Therefore, any of the 10 lines into the gates 240, 242 nand 232 exclusive of the expander connection 238 to the gate 232 will cause an output on the conductor 234. It will be understood that the other nine lines are connected to the other nine sample boards associated with discrete positions on the wheel 32 which are the same as circuit 154 and are connected to the output conductors 162 through 178 of the circuit 150 and to the output conductor 194 of the time division counter and the seek empty position signal over conductor 196. Similarly the gages 244 and 246 in conjunction with the other three input leads to the gate 248 provide an output signal on the conductor 236 due to conditions on the other nine sample board circuits connected in the manner of sample board circuit 154.

After a cycle of counting and printout has been completed by the apparatus 10 a clear signal is passed to the sample board 154 through conductor 250 to clear counter 214. A reset signal is provided through conductors 252 and steering diode 254 to reset the flip-flops 202 and 212 on application of initial power to the system. The circuit 154 is thus enabled to accept another sample vial in the zero position or the 11 clock count position of a seek empty signal on conductor 196. An appropriate reset signal is also provided over conductor 258 to reset time division counter 152 each time an output appears on conductor 194.

Figure 10:
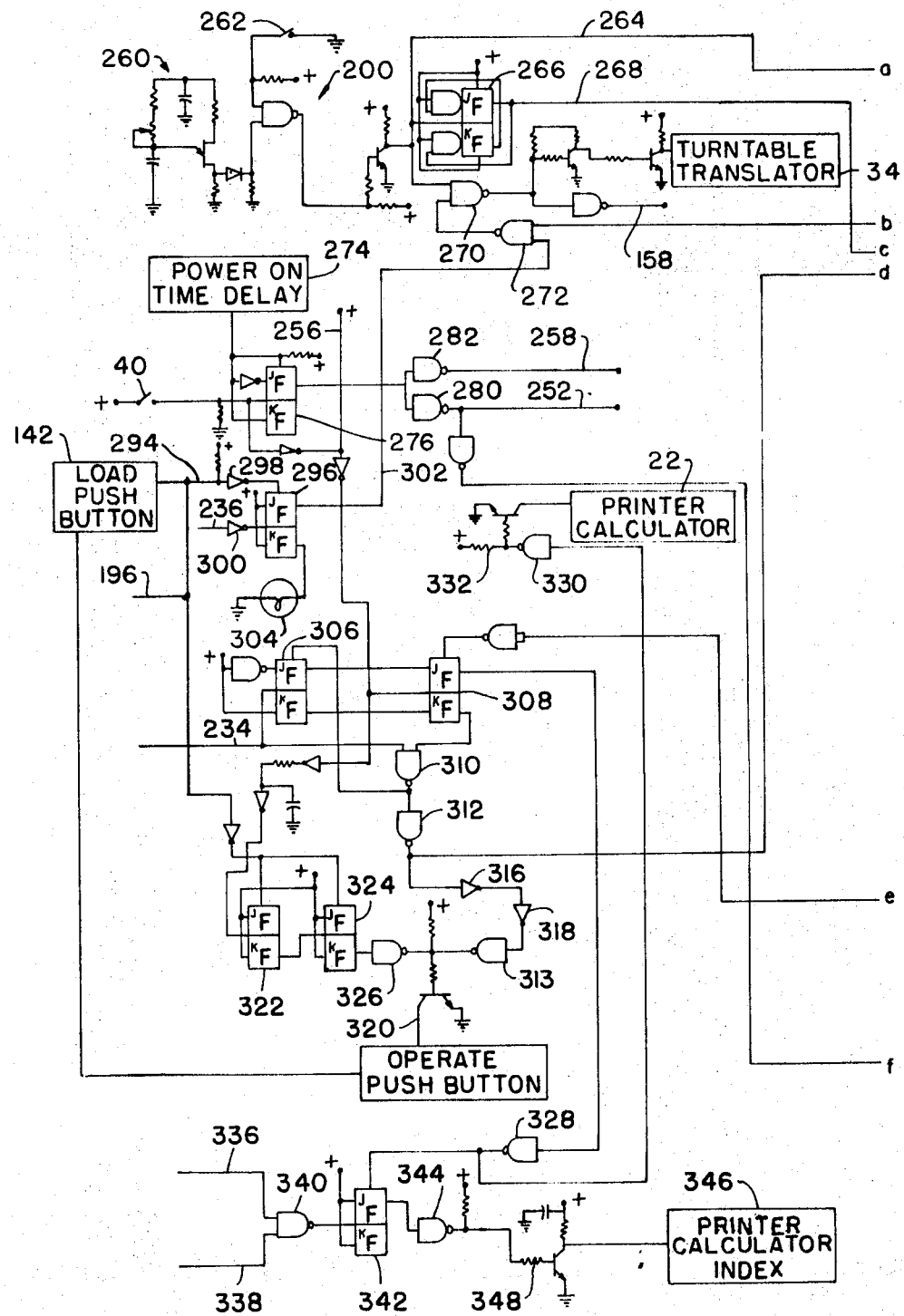

The clock 132, sample load logic circuit 134, the load operate pushbutton circuit 142, the turntable reed switch 40, the counter, the printer calculator and turntable translator actuating circuits 20, 22 and 34 are illustrated in FIG. 10.

In particular, a 60 hertz clock 260 having an emergency stopclock switch 262 associated therewith is provided and produces on conductor 264 a 60 hertz output signal. The 60 hertz output signal from the clock 260 is reduced in a flip-flop divider 266 to a 30 hertz clock pulse on conductor 268. The 60 cycle clock pulses are further fed through a gate 270 on reception of a signal through gate 272 initiated by either an automatic stop signal from conductor 234 of FIG. 9 or a manual stop pulse from conductor 236.

The signal out of gate 270 is the input signal on conductor 158 of the time sequence circuit 150 in FIG. 9. The signal output of the gate 270 is further fed to the turntable translator circuit 35 to energize the motor 34. Thus, on receipt of either a manual stop or an automatic stop signal at gate 272 the clock pulses to the time sequence circuit 150 are stopped and the turntable is stopped.

The sample load logic portion of the circuit shown in FIG. 10 operates after an initial startup period determined by time delay circuit 274 to allow clearing and resetting of the apparatus 10 after power is on. After the startup time delay circuit 274 enables the flip-flop 276 to be toggled once on the switch 40 being closed due to passing of the magnet 38 adjacent the switch 40. The closing of the switch 40 provides the time sequence input reset signal on conductor 256 of the time sequence circuit 150.

Change of state of the flip-flop 276 also provides a reset signal through gates 280 and 282 to conductor 258 of the time division counter and to conductor 252 going to each of the sample boards 0 through 9. The same reset signal is provided on conductor 284 to gates 286, 288 and 290 and the flip-flop 292 of the circuit shown in FIG. 11.

A seek empty position signal is provided through load operate pushbuttons 142 on conductor 294 which is immediately passed to the seek empty position conductor 196 in circuit 154 and prepares the flip-flop 296 to change condition through inverter 298 on reception of a manual stop load sample signal on conductor 236 from circuit 156 through inverter 300. Change of condition of the flip-flop 296 provides a manual stop signal on conductor 302 and at the same time lights a neon indicator light through circuit 304 indicating that it is possible to load a sample vial in the position at which the wheel 32 will stop due to a manual stop signal on the conductor 302.

In response to an automatic stop signal from the conductor 234 of circuit 156, the flip-flop 306 is toggled so that it changes condition and prepares flip-flop 308 whereby on reception of the next pulse due to closing of the reed switch 278 the flip-flop 308 will also change condition. Changing the condition of the flip-flop 308 will cause the signal to pass through the gate 310 due to the automatic stop signal on line 234 being present which will reset the flip-flop 306 and will provide an automatic stop signal through the gate 312 and gate 314 in FIG. 11 to the gate 272 and thus stop the clock to the circuit 150 and the turntable, as before.

In addition, the automatic stop signal from gate 313 operates to energize a circuit 320 which in turn opens a seek empty position pushbutton in circuit 142 through the operate pushbutton and line 321. Thus, if a manual stop signal is present and the seek empty position pushbutton be pushed seeking an empty position on wheel 32, the circuit 142 would be opened.

Similarly when the seek empty position pushbutton is pushed a signal is fed to the flip-flops 322 and 324 to prepare these flip-flops for toggling once on closing of the reed switch 40. Toggling of the flip-flop 322 on closing of the reed switch 40 causes an output therefrom to toggle the flip-flop 324 and thus provide a signal out of the gate 326 which will again cause the seek empty position pushbutton to open after two revolutions because of reed switch 40 actuating twice if an available empty position is not present.

When the flip-flop 308 changed condition in response to a signal from the reed switch 40 an output was provided to the gate 328 through which the gate 330 and circuit 332 removes a printer reset signal on printer calculator 22 to prepare the printer to print out.

The input to conductors 336 and 338 is from the counter 180 in circuit 150. Thus, each time the counter in the circuit 150 counts to twelve, a signal is sent through gate 340 to toggle the enabled flip-flop 342 and provide an output signal through the gate 334 sufficient to actuate the printer counter indexing mechanism circuit 346 through circuit 348, whereby the printer counter is caused to index once each time a vial on the wheel 32 passes the vertical position to allow the printer to print out the number of a specific vial on receiving a printout signal.

Figure 11:
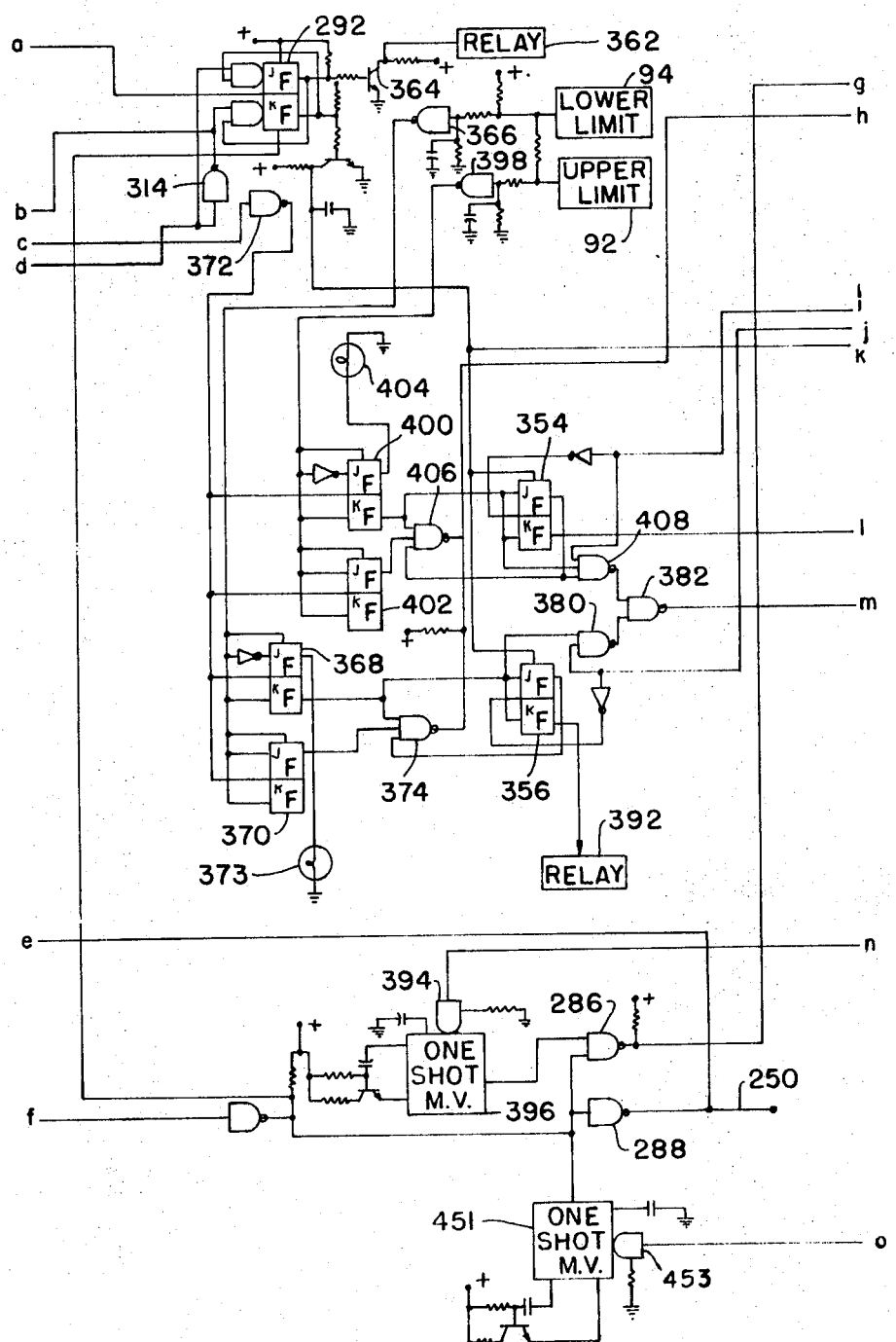
Figure 12:
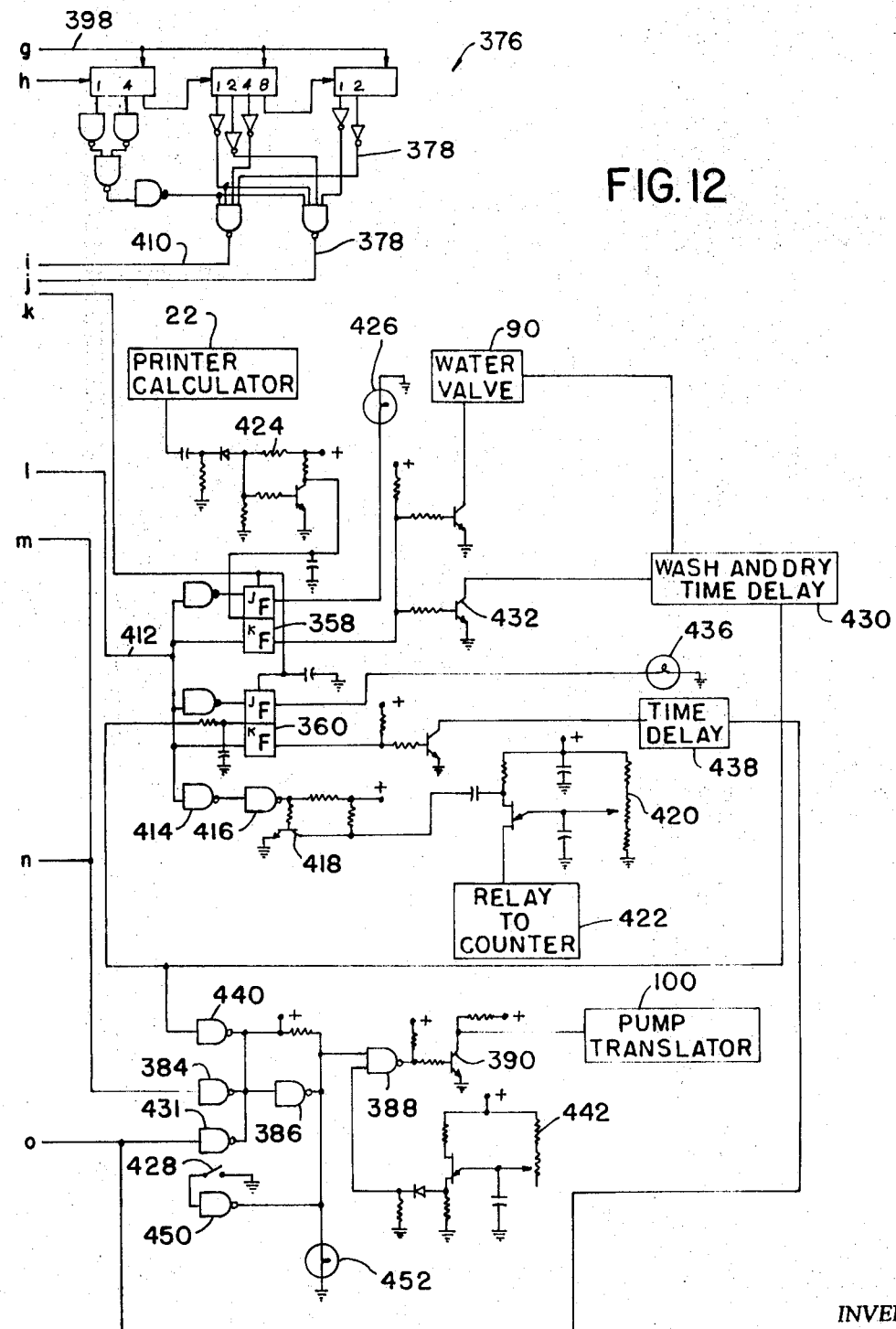

When an automatic stop signal is passed through gate 314 in FIG. 11 to the flip-flop 292, the flip-flop 292 is prepared to change state, whereby the next 60 hertz signal from clock 260 will cause the flip-flop 292 to toggle. Toggling or changing condition of the flip-flop will lift the reset condition on flip-flops 354 and 356 as well as flip-flops 358 and 360. Additionally, the changed condition of flip-flop 292 will energize the relay circuit 362 through circuit 364 causing the autopipettor motor 60 to actuate in a direction to drive the dip tube 74 into the vial positioned below the dip tube 74 which vial 26 has been found to be ready for withdrawal of a portion of the sample serum therefrom. The counting and printout cycle is thus started on the change of state of flip-flop 292.

When the dip tube 74 has been driven to its lower limiting position, the limit switch 94 is closed to stop motor 60 and to provide a signal through gate 366 which prepares the flip-flops 368 and 370 for toggling. The next 30 hertz signal through gate 372 will toggle the flip-flops 368 and 370 to light the indicator light 373, provide an output signal from the gate 374 at 15 hertz and prepare the flip-flop 356 to be toggled.

The 15 hertz signal from the gate 374 is fed to the counter circuit 376. Counter circuit 376 is arranged to provide a first signal output on conductor 378 to toggle the flip-flop 356 after 135 counts of the 15 hertz output signal of the gate 374.

During the counting time of the counter 376 the changed output of the flip-flop 368 which changes state only once in response to the 30 hertz input thereto is allowed to pass through the gate 380 and gate 382 to energize the pump translator 100 through gate 384, gate 386, gate 388 and circuit 390. When the counter 376 counts 135 counts the gate 380 will no longer allow a signal to pass therethrough and the flip-flop 356 is reset to close relay circuit 392. Removing the signal from gate 382 produces a signal through gate 394 which actuates the one shot multivibrator 396 to provide an output from gate 286 and reset the counter 376 over reset line 398.

Closing the relay circuit 392 actuates the dip tube motor 60 in the opposite direction whereby the dip tube now containing a metered sample of the serum from the vial 26 beneath the dip tube is withdrawn from the dip tube and is moved to the upper limiting position thereof, as shown in FIG. 4. When the upper limit switch 92 is engaged with the dip tube in the upper limiting position, as shown in FIG. 4, the dip tube motor 60 is deenergized and a signal is passed through gate 398 to place the flip-flops 400 and 402 in a condition to be toggled on receipt of the next 30 hertz signal from gate 372. When the flip-flops 400 and 402 are caused to change condition a neon indicator light 404 is energized. The flip-flop 400 is caused to remain in the changed condition while the flip-flop 402 changes state to provide a 15 hertz signal through gate 406 to the counter 376, as before, The flip-flop 354 is prepared for toggling and a signal to actuate the pump translator 100 through gates 384, 386 and 388 is again provided through gate 382 from gate 408.

In this condition the sample from the autopipettor 14 is transferred through the pump 16 into the coil 118 in the well of the scintillation detector 18. After the counter 376 has counted 255 counts a signal is provided on conductor 410 which blocks the signal through the gate 408 to turn the pump translator 100 off and the flip-flop 354 is toggled. The counter 376 is again reset and an output signal is provided to the flip-flops 358 and 360 to them to be triggered over conductor 412. The signal over conductor 412 through gates 414 and 416 and circuits 418 and 420 actuates the relay circuit 422 to start the counter system to record the radioactivity of the sample portion of blood serum now in the coil 188 of the scintillator 18. After a predetermined time the counter 20 will cause the printing calculator 22 to pring out the sample number, the number on the counter 20 and the thyroid binding index of the sample of blood serum in the scintillation detector 18 after comparing the counter 20 with a normal count initially set in the printer calculator. An input signal is then provided to the circuit 424 in FIG. 12 from the printer calculator circuit 22. The flip-flop 358 will change state on receiving a trigger pulse from circuit 424 and will provide a neon indicator light 426 light 426 and energize the water shower valve 90 to provide a wash on the end 86 of the dip tube 74 for a time determined by electromechanical wash and dry time delay 430 energized through circuit 432.

At this time the electromechanical wash and dry time delay 430 also permits translator to be energized through gate 440, gates 386 and 388 and circuit 390 for a predetermined period, such that the automatic autopipettor pump and scintillation detector coil 118 are washed completely free of any radioactivity from the sample serum.

After the predetermined time necessary for the radioactivity to be removed from the autopipettor 14, metering pump 16 and scintillation detector 18 the electromechanical time delay circuit 430 opens to close the water valve 90. At the end of the wash time the trailing edge of the energizing signal to gate 440 causes the flip-flop 360 to change state. The neon light 436 is thus energized and the pump translator is kept through time delay 438 and the gate 428 an additional time necessary to dry the automatic autopipettor pump 14, metering pipe 16 and scintillation detector 18.

When time delay 438 times out the printout cycle is finished and the trailing edge of the energizing signal to gate 431 is sent through gate 453 to actuate the one shot multivibrator 451 and provide clear signals to gate the clock on again, start the turntable agitator and otherwise prepare the circuit for future cycles of operation.

It will be noted that a 200 hertz clock 442 is provided in conjunction with the pump translator to insure accurate synchronization of the metering pump with the rotating wheel 32 which is actuated by the clock 260 and synchronized by the reed switch 40 and magnet 38.

An emergency stop pump switch 428 and gate 450 are provided, as shown in conjunction with pump indicator neon light circuit 452.

An automatic cycle of operation of the apparatus 10 is thus completed and the clear and reset signals are provided to reestablish the original conditions on the circuit elements.

What we claim as our invention is:

1. A liquid-sampling and agitating device, comprising: a turntable agitator means adapted to receive and retain a plurality of sample vials, each vial containing a liquid sample, and rotatable to index the vials and agitate the liquid samples therein, an autopipettor means fixed in relation to the rotatable turntable including a pipette extendable into one of the sample vials, when the turntable is properly indexed to receive the pipette to draw a sample from the vial, and a timing and sequencing control means operably connected to the turntable agitator means and the autopipettor means, including a timing and memory control means adapted to remember the random position of each sample vial on the turntable agitator means and when the agitation of each liquid sample is completed, a turntable indexing means adapted to index the turntable to accurately receive a sample vial beneath the pipette after the liquid sample contained in said vial has been agitated for a predetermined period of time, and a pipette control means adapted to extend the pipette into said sample vial to withdraw a liquid sample therefrom.

2. The liquid sampling and agitating device defined in claim 1, characterized in that said device includes a scintillation detector communicating with said autopipettor means and receiving the liquid sample therefrom, a counter means operably connected to said scintillation detector adapted to provide a count proportional to the radioactivity of the liquid sample, and said timing and sequencing control means including a sequence control means adapted to operate the scintillation detector when a liquid sample is received therein and thereafter automatically actuate said counter means to count and printout a determination of the radioactivity.

3. The liquid sampling and agitating device defined in claim 1, characterized in that said autopipettor means includes a washing and indexing means adapted to rotate the pipette into an angularly related wash position, and said sequencing and control means includes means automatically rotating the pipette into the wash position after each sample is drawn through the pipette.

4. The liquid sampling and agitating device defined in claim 1, characterized in that said autopipettor means includes a metering pump operably connected to said pipette and adapted to draw a precise predetermined liquid sample from a vial positioned on the turntable, said metering pump comprising a parastaltic pump, a stepping motor connected thereto to drive said parastaltic pump, and providing in combination an accurate volumetric control for the autopipettor means, and a means operably connected to the stepping motor providing digital control signals for the stepping motor.

5. The liquid-sampling and agitating device defined in claim 1, characterized in that said timing and sequencing means includes means adapted to seek an empty position on the turntable agitator means and index the turntable to permit receipt of a vial on the turntable in the said empty position.

6. Structure as set forth in claim 1 wherein the turntable agitator means comprises a vertically extending rotatable wheel and means for retaining a plurality of the sample vials on the wheel in angularly spaced-apart radial locations and the vials are positioned in the vial retaining means and include means for preventing spilling of a liquid sample therefrom on rotation of the wheel 360° in a vertical plane while allowing a pipette to pass therethrough.

7. The liquid-sampling and agitating device as defined in claim 6, characterized in that said cap means includes a tube extending into the vial having an aperture extending through the cap and through the tube.

8. Apparatus for performing tests or the like comprising an agitator means for receiving a plurality of liquid samples in vials and tumbling them in the vials with separate material to impart a detectable parameter to the samples in accordance with a test being performed, withdrawing means operably associated with the agitator means through which a portion of the sample is then withdrawn from a vial positioned on the agitator after a predetermined incubation time of the sample on the agitator, a pump operably connected to the withdrawing means for withdrawing a portion of the sample from the vial on the agitator, detection means operably connected to the pump for receiving the portion of the liquid sample withdrawn from the vial on the agitator means, for detecting the particular sample parameter and for providing an indication thereof relative to the particular parameter of a normal sample, and timing and sequencing control means operably connected to the agitator means, withdrawing means, pump and detector means, including a timing and memory control means adapted to remember the random position of each vial on the agitator means and when the agitation of each of the liquid samples is completed, an indexing means adapted to automatically position a vial on the agitator means for communication with the withdrawing means, then the predetermined agitation period is complete, and a sequence control means adapted to operate the withdrawing means automatically upon positioning of a vial in communication therewith and transfer the sample to the detection means.

9. Structure as set froth in claim 8 wherein the timing and sequencing control means includes means for sequencing the autopipettor and pump to first withdraw a portion of a liquid sample from a vial on the turntable agitator, pump the sample to the scintillation detector means and subsequently pump water followed by air through the autopipettor means, pump and scintillation detector means.